March 10, 1959  C. B. CHRISTENSEN  2,876,807
MACHINE TOOL CENTER
Filed Aug. 8, 1957

INVENTOR.
Carl B. Christensen
BY
H. Gibner Lehmann
AGENT

United States Patent Office 2,876,807
Patented Mar. 10, 1959

2,876,807

MACHINE TOOL CENTER

Carl B. Christensen, Fairfield, Conn., assignor to Ready Tool Company, Stratford, Conn., a corporation of Connecticut Application August 8, 1957, Serial No. 677,074

5 Claims. (Cl. 142—55)

This invention relates to work-supporting centers for use in machine tools such as grinding machines, lathes and the like.

Heretofore, in connection with machine tools it has been the practice to provide one type or style of work-supporting center for metal work-pieces, and a different type of center for use with wood or other workpieces of soft material. It is well known that the usual tapered tip of a center intended for metal working is not suitable for engaging and supporting wooden workpieces, since it cannot supply sufficient longitudinal thrust or force and still prevent splitting of the piece. In consequence, separate, differently constructed centers have been provided for workpieces of wood or other soft material, these centers having work-engaging faces especially adapted to apply proper longitudinal thrust without causing splitting or other damage to the workpiece.

An object of the present invention is to provide an improved machine-tool center which may be used for both wooden and metal workpieces by the provision of a novel adaptor or fitting, with which one type of tip may be readily converted into the other type. Preferably, as disclosed herein, the basic tip provided on the work-supporting center is of the type suitable for metal workpieces, and conversion of said tip to adapt it for wooden or other workpieces of soft material is effected by the provision of an annular collar member, together with spring detent means for releasably mounting such collar member on the metal-workpiece-accommodating tip.

Another object of the invention is to provide a novel and improved machine center with convertible tip structure as above set forth, wherein the conversion from one type of tip to another may be easily and quickly effected.

A feature of the invention resides in the provision of an improved convertible-tip type of machine-tool center as above characterized, which is extremely simple in its construction, yet effective and reliable in operation.

Another feature of the invention resides in the provision of an improved tip adapter for centers as above outlined, which may be economically fabricated and manufactured, having relatively few parts of simple construction.

Other features and advantages will hereinafter appear.

In the drawings accompanying this specification, similar characters of reference indicate corresponding parts wherever possible in the several views, in which.

Figure 1:
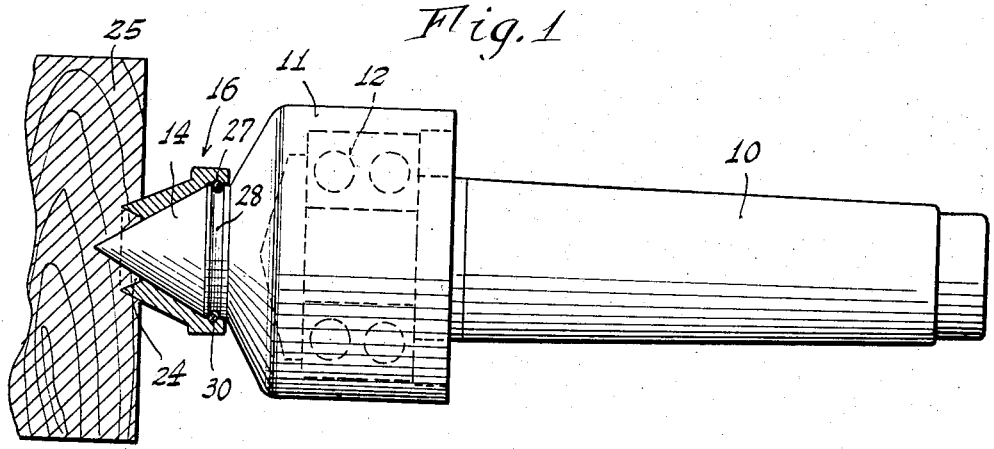
Figure 1 is a side elevational view of an improved machine-tool center made in accordance with the invention and shown as supporting a wooden workpiece. Illustrated in axial section is a removable tip adapter.
Figure 2:
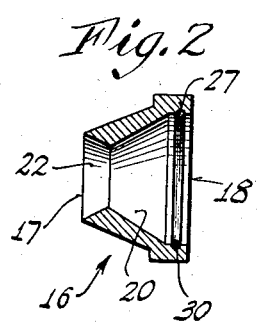
Fig. 2 is an axial sectional view of the tip adapter of the center, per se.
Figure 3:
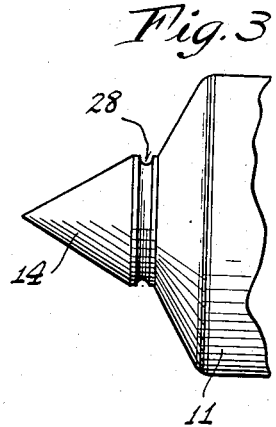
Fig. 3 is a fragmentary side elevational view of the machine-tool center with the adapter removed.
Figure 4:
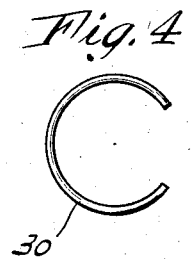
Fig. 4 is a plan view of a detent spring constituting a portion of the adapter.

Referring first to Figs. 1–3, the machine-tool center shown therein comprises a shank 10 having a usual Morse taper, said shank rotatably carrying a head 11, preferably by means of anti-friction bearings 12.

On the head 11 there is provided a conical, hardened, work-engaging tip 14 adapted to engage and support workpieces of metal or other hard and unyielding material. As is well understood, the conical tip 14 may have an apex angle of 60° or slightly in excess thereof, to enable it to fit without looseness the center-drill recess usually provided in workpieces for this purpose.

The shank 10, head 11 and tip 14 as above described commonly constitute what is known as a "live center," inasmuch as the tip and head may rotate with the workpiece while the shank 10 remains stationary. Friction, heat and wear are, of course, reduced to a minimum by the provision of the anti-friction bearing means 12.

The hardened tip or point 14 is understood to be well adapted for use with workpieces of hard or unyielding material, such as metal, rigid reinforced plastics and the like. However, where workpieces of wood or softer material are to be supported, the tip 14 is not suitable by itself, inasmuch as with the working pressures required it becomes too deeply imbedded in the workpiece and may cause splitting, cracking, etc. of the same, and misalignment resulting in spoiled work.

In accordance with the present invention I provide a novel and improved accessory or adapter device for use in conjunction with the pointed tip 14, thereby to enable the same live center to be used with workpieces of wood or other soft material. This accessory device, referring to Figs. 1 and 2, may advantageously comprise a conical annular collar 16 of generally tubular structure, having a small open end 17 and a larger open end 18. The collar 16 has an inner conical surface 20 conforming closely to the tapered or conical surface of the tip 14 whereby a snug and accurate fit may be established between such surfaces when the collar is placed on the tip as shown in Fig. 1. The collar 16 also has a second inner surface 22 of shorter axial dimension, which is adapted to cooperate with the nose or extremity portion of the tip 14 to provide therewith an annular recess or groove 24, Fig. 1, having a V-shaped section.

Thus, when the collar 16 is placed on the tip 14 the V-shaped groove 24 constitutes in effect a shoulder or abutment adapted to engage and compress the end portion of the wooden workpiece 25. The point of the tip 14, as well as the sharp lip at the small end of the collar 16 will become imbedded in the workpiece, all as shown, whereby an effective and reliable support of the piece is established, producing the least amount of disfiguration thereof and counteracting any tendency for the piece to split or crack.

I have found that a machine-tool center as thus constituted, having the tip 14 and collar 16 is admirably suited for use with workpieces of soft material such as wood, yieldable plastic, and the like. By virtue of the head 11 being rotatable and carried by the anti-friction bearings 12, there will be no relative movement between the head and the workpiece, and accordingly the tip 14 and the sharp edge of the collar 16 will effectively support the workpiece at all times, these parts turning as a unit.

For the purpose of releasably holding the collar 16 on the tip 14 and permitting easy and quick removal of the collar, I provide a pair of annular grooves 27 and 28, one in the inside of the collar at the large end thereof and the other at the base portion of the tip 14. Further, in the collar 16 I provide a C-shaped spring wire retainer 30 which is adapted to snap over the base of the tip 14 and occupy the groove 28 when the collar 16 is applied to the center.

It will be appreciated that the wire retainer 30 is called upon only to hold the collar 16 against inadvertent removal while the center is being handled, and that once the center is put into operation supporting a workpiece, the force exerted thereby against the collar will at all times hold it securely in place on the tip 14.

Figure 5:
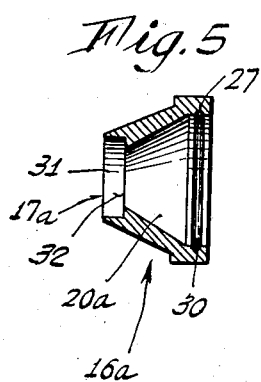
Fig. 5 is an axial sectional view similar to that of Fig. 2 but illustrating an adapter constituting a modification of the invention.

Another embodiment of the invention is illustrated in Fig. 5, wherein there is shown a collar 16a of tubular construction having a small open end 17a provided with a cylindrical counterbore 31 and an annular shoulder 32 connecting said counterbore to the tapered inner face 20a. With such construction the shoulder 32 constitutes a flat abutment adapted for engagement with the workpiece, as distinguished from the annular V-groove 24 in the form of the invention shown in Figs. 1–4.

It will now be understood from the foregoing that I have provided a novel and improved machine-tool center which is so constituted and organized that it may be easily and quickly adapted for use with either workpieces of tough, rigid materials such as metal or else workpieces of softer materials such as wood, soft plastic and the like. The adapting of the center for one or the other kind of workpiece may be easily and quickly effected, and with the present organization there is obviated the necessity for a duplication of shanks, heads and bearings. Accordingly, the cost is low as compared with the stocking of two centers, one for each type of work.

Variations and modifications of the invention may be made within the scope of the claims, and portions of the improvements may be used without others.

I claim:

1. A machine-tool center comprising a support member having a pointed, conical tip adapted for engaging and supporting a metal workpiece; an annular collar member having generally a hollow, frusto-conical configuration with open ends of large and small diameter respectively, said collar member having a conical bore adapted to fit closely to the conical tip of the support member, the small-diameter end of the collar member having an annular face for engagement with a wooden workpiece to resist thrust forces exerted thereby; and cooperable means on the large end of the collar member and on the large-diameter portion of said conical tip, for releasably holding the collar member on said tip to adapt it for use with wooden workpieces, said collar member being removable to fully expose the tip for use with metal workpieces.

2. The invention as defined in claim 1, in which the said cooperable means comprises a spring, snap element carried by one member, and shoulder means on the other member, engageable with said snap element.

3. The invention as defined in claim 2, in which the snap element comprises an annular wire spring, and in which the said other member has an annular groove a wall of which constitutes the said shoulder means.

4. The invention as defined in claim 1, in which the annular workpiece-engaging face of the collar member is of wedge cross section, said face meeting the conical surface of the tip when the latter supports the collar member.

5. The invention as defined in claim 1, in which the annular face of the collar member includes a planar annular shoulder adapted to engage and abut the wooden workpiece, said shoulder being disposed in a plane normal to the axis of the collar member.

References Cited in the file of this patent

UNITED STATES PATENTS

| | | |
|---|---|---|
| 99,269 | West | Jan. 25, 1870 |
| 725,697 | Gilman | Apr. 21, 1903 |
| 758,881 | Yost | May 3, 1904 |
| 960,678 | McIntyre | Jan. 7, 1910 |